United States Patent [19]

Mishra et al.

[11] Patent Number: 5,728,637
[45] Date of Patent: Mar. 17, 1998

[54] NANOCRYSTALLINE ALUMINA-DIAMOND COMPOSITES

[75] Inventors: Rajiv S. Mishra; Amiya K. Mukherjee; Charles E. Lesher, all of Davis, Calif.

[73] Assignee: The Regents of the University of California, Oakland, Calif.

[21] Appl. No.: 595,179

[22] Filed: Feb. 1, 1996

[51] Int. Cl.$^6$ .................................... C04B 35/117
[52] U.S. Cl. .................... 501/127; 501/100; 501/153
[58] Field of Search .................... 501/127, 153, 501/100

[56] References Cited

U.S. PATENT DOCUMENTS

| | | | |
|---|---|---|---|
| 4,627,317 | 12/1986 | Komanduri et al. | 82/1.11 |
| 4,749,667 | 6/1988 | Jun et al. | 501/89 |
| 4,863,490 | 9/1989 | Buljan et al. | 51/293 |
| 4,925,458 | 5/1990 | Mehrotra et al. | 51/293 |
| 4,961,757 | 10/1990 | Rhodes et al. | 51/309 |
| 5,024,976 | 6/1991 | Mehrotra et al. | 501/89 |
| 5,071,797 | 12/1991 | Hida | 501/87 |
| 5,110,770 | 5/1992 | Brandt | 501/89 |
| 5,215,942 | 6/1993 | MacKenzie et al. | 501/12 |
| 5,326,731 | 7/1994 | Bhola et al. | 501/87 |
| 5,342,564 | 8/1994 | Wei et al. | 264/63 |
| 5,397,370 | 3/1995 | Mehrotra et al. | 51/309 |
| 5,418,197 | 5/1995 | Brandt | 501/89 |
| 5,453,312 | 9/1995 | Haas et al. | 428/143 |

OTHER PUBLICATIONS

Callister, "Materials Science and Engineering, an Introduction," John Wiley & Sons, pp. 98–103, 1985.
Becher, Paul F., "Recent Advances in Whisker–Reinforced Ceramics," *Annu. Rev. Mater. Sci.* (1990) 20: 179–95 (no month).

Cottom, B.A., et al., "Fracture Toughness of Nanocrystalline $ZrO_2$— 3mol% $Y_2O_3$ Determined by Vickers Indentation," *Scripta Materialia* (1996) 34(5) : 809–814 (no month).

Krell, Andreas, "Load Dependence of Hardness in Sintered Submicrometer," *J. Am. Ceram. Soc.* (1995) 78(5) : 1417–1419 (no month).

Liu, Jenq, et al., "Normal–Pressure Hot–Pressing of a–Alumina–Diamond Composites," *J. Am. Ceram. Soc.* (1991) 74(10) : 2666–2668 (no month).

Noma, Tatsuo, "Effect of heat Treatment on Fracture Toughness of Alumina–Diamond Composites Sintered as High Pressures," *J. Am. Ceram. Soc.* (Feb. 1985) 68(2) : C–36—C–37.

Noma, T., et al., "Toughening in Very High Pressure Sintered Diamond–Alumina Composite," *J. of Materials Sci.* (1984) 19: 2319–2322 (no month).

Chu, May–Ying, et al., "Processing of Diamond/Alumina Composites for Low Wear Applications," *J. Mater. Res.* (Nov. 1992) 7(11) :3010–3018.

*Primary Examiner*—Karl Group
*Attorney, Agent, or Firm*—Townsend and Townsend and Crew LLP

[57] ABSTRACT

Alumina composites of unusually high hardness and toughness are formed by combining alumina and diamond in nanocrystalline form, followed by sintering at high pressure.

10 Claims, No Drawings

NANOCRYSTALLINE ALUMINA-DIAMOND COMPOSITES

GOVERNMENT RIGHTS

This invention was made with Government support under Grant No. DMR-9314825, awarded by the National Science Foundation. The Government has certain rights in this invention.

BACKGROUND OF THE INVENTION

As new materials and more sophisticated uses of materials continue to develop, there is an ever increasing need for composites of greater hardness and toughness. Advanced ceramics are manufactured for use in anti-friction roller and ball bearings, and as metal-cutting and shaping tools, and serve in general as wear-resistant materials of construction and fabrication. A principal component of many advanced ceramics for these applications is alumina, and many such ceramics consist of alumina matrices supplemented by the inclusion of second-phase particles. Improved toughness, for example, has been achieved by combining alumina with zirconia, silicon carbide, titanium carbide, titanium carbonitride, titanium nitride, magnesia, chromia, and carbides, nitrides and borides of vanadium, niobium and tantalum. Composites of alumina and diamond have also been disclosed.

Hardness and toughness have been observed to vary with grain size, particularly between the nanometer and micrometer ranges. For zirconia, studies have shown that densified masses with grain sizes in the nanometer range are less hard than those with grain sizes in the micrometer range. Studies of alumina have shown that hardness reaches a maximum in the micrometer range, and studies with composites of alumina and silicon carbide have yielded inconsistent results.

SUMMARY OF THE INVENTION

It has now been discovered that alumina composites of unusually high hardness and fracture toughness are formed by the combination of alumina with diamond densified from a powder mixture, whereby both components in the mixture are present in the form of nanoparticles. The grain structure of the densified composite therefore contains grains in the nanometer range, which range is defined herein as including grains or particles having diameters of about 200 nm or less. The invention also resides in a process for the manufacture of a densified composite by combining powders of alumina and diamond, each of which has a majority of particles in the nanometer range, forming a green body from the combined powders, and sintering the green body at high temperature and pressure to achieve densification, preferably approaching full densification, without significantly compromising (increasing) the grain size. Here as well, preferred embodiments are those in which both components have a majority of their particles in the nanometer range.

This invention offers the advantages of densified composites with improved mechanical properties and superplasticity. Composites of this type are highly useful as cutting and shaping tools, as well as in bearings and other typical applications of high performance materials. Details of these and other features, uses and advantages of the invention will become apparent from the description that follows.

DETAILED DESCRIPTION OF THE INVENTION AND PREFERRED EMBODIMENTS

Starting materials for the product and process of the present invention are alumina and diamond powders, each in fine particulate form of which at least about 50% is nanocrystalline. The term "nanocrystalline" is used herein to denote particles having a diameter of 200 nm or less. Preferred powders for use in this invention are those in which about 75% or more of the particles are in the diameter range of 200 nm or less, and more preferred are those in which about 90% or more are in that range, and most preferred are those in which substantially all of the particles are in that range. The particle size can be also characterized by the number average diameter. In preferred embodiments, this value is within the range of from about 30 nm to about 300 nm, and in more preferred embodiments, the range is from about 75 nm to about 150 nm. The size ranges in this paragraph apply both to the particles in the powders prior to their consolidation into green bodies or into the final densified composite, and to the grains in the green bodies and densified composites.

The alumina is obtainable from conventional sources as aluminum oxide in any of the various crystalline forms, including alpha, beta, gamma, theta, kappa, delta, eta, chi and rho. The lattice structures of some of these crystalline forms are as follows: alpha: hexagonal; beta: hexagonal and cubic; gamma: tetragonal; delta: orthorhombic and tetragonal; theta: monoclinic; and kappa: hexagonal. Crystalline forms other than alpha-alumina will often be converted to alpha-alumina upon sintering. Gamma-alumina, for example, will convert to alpha-alumina at approximately 1500° C., although at high pressures conversion will occur at a lower temperature. Alpha-alumina occurs in nature as corundum, found in igneous and metamorphic rocks. Alumina powder in the nanocrystalline range in many of the above crystalline forms can be obtained from commercial alumina suppliers.

The diamond powder can be either natural or synthetic diamond, and can also be obtained from commercial suppliers in the nanocrystalline size range. Synthetic diamond is manufactured either from graphite or by vapor-phase deposition from a carbon-bearing gas, using procedures known in the industry.

The volume ratio of aluminum oxide to diamond in the powder mixture is from about 75:25 to about 95:5, and in preferred embodiments from about 85:15 to about 95:5. In the most preferred embodiments, the range is from about 87.5:12.5 to about 92.5:7.5.

The powders are mixed uniformly, and this can be achieved by any known method. Mixing can be accomplished mechanically and in dry form, but preferred methods are those in which the powders are combined with an inert liquid to form a slurry, which is then mixed to achieve a uniform distribution of the two types of particles, followed by removal of the liquid to leave the dry powder mixture. Mixing of the slurry can be achieved by various processes such as aeration, propeller agitation, turbine agitation, homogenization through valves, and ultrasonic agitation. For particles of the size ranges contemplated for this invention, ultrasonic agitation is particularly effective. The ultrasonic energy can be developed either mechanically or electrically.

The inert liquid can be any volatile liquid that readily wets the particles and is readily evaporated once mixing has been accomplished. Common organic liquids normally used as solvents can be used effectively for this purpose. Examples are alcohols, ketones, aromatics, esters, and liquid alkanes and olefins.

The formation of green compacts can be achieved by conventional techniques as well, such as for example simple compaction at room temperature (cold pressing) or at elevated temperatures. Compaction techniques include uniaxial pressing, isostatic pressing (cold or hot), and powder rolling (cold or hot). The compaction pressure is not critical and can vary widely. In most cases, satisfactory results will be achieved using compaction pressures of from about 1 MPa (megapascal, i.e., $10^6$ pascals) to about 1,000 MPa, or preferably from about 100 MPa to about 500 MPa.

Sintering and densifying of the green compacts is achieved by conventional techniques as well, under elevated temperature and pressure. The degree of densification will vary with the sintering conditions, notably the sintering temperature. Sintering techniques include hot equiaxial pressing, hot isostatic pressing, and hot forging such as the use of a cubic anvil apparatus. The temperature can vary widely, but best results in most cases are obtained using temperatures within the range of about 800° C. to about 1400° C., and pressures within the range of about 10 MPa (megapascals) to about 10 GPa (gigapascals, i.e., $10^9$ pascals). In preferred methods, the process is performed at a temperature within the range of about 850° C. to about 1250° C. and a pressure of from about 0.3 GPa to about 3 GPa.

The rates of heating the composite and returning the composite to room temperature are not critical and may vary, although such qualities as the hardness and fracture toughness of the densified product will vary with the heating and cooling rates. One method of performing the sintering and densification in a manner expected to result in higher hardness and fracture toughness, is to use two heat treatments in succession, with only the first involving high pressure and the second being performed at a lower rate of increase and decrease than the first. In the first treatment, the temperature is raised at a rate of about 100–500° C./minute, preferably at a rate of about 125–200° C./minute (in a currently tested method the rate of 150° C./minute was used), following by cooling at substantially the same rate or at a rate within one of these ranges, all at the high pressures indicated above. The second heating is then done at a rate of about 200–500° C./hour (or more typically about 200° C./hour), followed by cooling at the same rate or a rate within the same range, both heating and cooling in this second stage being performed under atmospheric pressure. Control of the heating and cooling rates is readily achieved by conventional equipment, such as a resistance heater in conjunction with a monitoring thermocouple.

The formation of the green compact as an intermediate stage promotes ease of handling and compatibility with sintering equipment. The densification can alternatively be performed directly on the powder mixture by eliminating this intermediate stage and instead exposing the powder mixture directly (or gradually) to the sintering conditions. Sintering equipment is generally more conducive however to green compacts rather than powder, and the use of green compacts further aids in the formation of the final tool, bearing or other article or shape that the composite will assume, permitting a broad range of shapes, sizes and uses.

Densification is preferably performed to at least about 95% of the theoretical density of the mixture forming the composite, and most preferably to at least about 99% of the theoretical density. The term "theoretical density" is used herein in its conventional sense as used in the metallurgy industry, to mean the density of the solid material exclusive of void spaces. Stated alternatively, densification is preferably performed by this invention to a density of at least about 3.50 g/cm$^3$. In the case of certain composite compositions, such as one in which the volume ratio of alumina to diamond is about 9:1 (with a theoretical density of 3.79 g/cm$^3$), the preferred density of the sintered composite is at least about 3.70 g/cm$^3$.

The composites of this invention may further contain one or more additional components such as other secondary phase materials, including those of the prior art such as silicon carbide, zirconium oxide and the others listed above. Preferably, these additional components are limited to less than 5% by volume, more preferably less than 1%. In the most preferred embodiments of the invention, the composite contains no such additional secondary phase materials, but instead consists entirely of alumina and diamond.

The characteristic beneficial properties of composites formed in accordance with the present invention are high hardness and high fracture toughness. Variations on the degrees of hardness and toughness can be achieved by adjusting the temperature and pressure conditions in the sintering stage. Nevertheless, the inclusion of nanocrystalline particles and the resulting nanocrystalline grain sizes result in a composite that is superior in these qualities to those formed from larger particles and grain sizes.

The following example is offered for purposes of illustration, and is not intended to limit the invention.

EXAMPLE

Nanocrystalline γ-alumina, nominally 29 nm in particle diameter, was obtained from Nanophase Technologies Corporation (Darien, Ill., USA), and diamond powder, 0–100 nm in particle diameter, was obtained from Warren Diamond Powder Co. (Olyphant, Pa., USA).

The powders were suspended in ethyl alcohol in a 90:10 (alumina:diamond) volume ratio, using 200 mL of alcohol per 20 g of the particle mixture. The suspension was mixed under ultrasonic agitation, then dried in an oven at 473 K for 24 hours. The resulting dried powder agglomerate was crushed and cold pressed at about 315 MPa to make green pellets having a diameter of 6.35 mm and a height of 3.4–3.6 mm, using about 0.25 g of powder for each pellet. The density of each pellet was about 2.27 g/cm$^3$.

The pellets were sintered using the procedure and apparatus described by Boyd, F. R., et al., "Apparatus for Phase-Equilibrium Measurements at Pressures up to 50 Kilobars and Temperatures up to 1750° C.," *J. Geophysical Research* 65:741–748 (1960). This involved the use of a cylindrical graphite heater 32 mm in length with an inner diameter of 6.4 mm and semi-sintered alumina filler rods occupying the heater interior. The filler rods were coated with BN (boron nitride) spray and fired at 1273 K for ten minutes to prevent them from sticking to the sintered pellet. The graphite heater was surrounded by a sheath of BaCO$_3$ and lead foil. Once a pellet was placed inside, the temperature was raised at a rate of 150 K per minute to a final temperature of 1273 K under a nominal pressure of 1–1.5 GPa, and the specimens were held at this temperature for ten minutes.

The densities of the sintered specimens were measured by water displacement, and the phases both before and after sintering were determined by x-ray diffraction. The microstructures were examined on fractured surfaces of the pellets by high resolution scanning electron microscopy after gold coating of the pellets. Grain sizes were likewise determined by x-ray diffraction and by x-ray line broadening. Microhardness was measured with a load of 400 g and a dwell time of 20 seconds. Hardness values were taken as an average of five indentations. Toughness values were determined from the indentation crack lengths, again averaging over five indentations.

The sintering resulted in fully dense nanocrystalline specimens, i.e., exceeding 99% of theoretical density, noting that theoretical density for α-alumina and diamond in a volume ratio of 9:1 is 3.79 g/cm$^3$. X-ray diffraction patterns showed that the alumina was transformed to the α-phase by the sintering and that the overall morphology was equiaxed. The average grain size was measured to be 106±17 nm. The hardness of the sintered composite was 24.7±0.56 GPa. The toughness of the sintered composite was 3.49±0.97 MPa m$^{1/2}$. For a composite sintered at 1373 K, the hardness was 32.0±1.6 GPa.

The foregoing is offered primarily for purposes of illustration. It will be readily apparent to those skilled in the art that the materials, proportions, operating conditions, procedural steps and other parameters of the invention may be further modified from what is described above without departing from the spirit and scope of the invention.

We claim:

1. A densified ceramic-based composite comprising aluminum oxide and diamond in a substantially uniform distribution at an aluminum oxide:diamond volume ratio of from about 75:25 to about 95:5, at least about 50% of said aluminum oxide and at least about 50% of said diamond being formed by densification of grains of less than about 200 nm diameter.

2. A densified ceramic-base composite in accordance with claim 1 in which said aluminum oxide and said diamond are each formed by densification of grains at least about 75% of which are less than about 200 nm in diameter.

3. A densified ceramic-base composite in accordance with claim 1 in which said aluminum oxide and said diamond are each formed by densification of grains at least about 90% of which are less than about 200 nm in diameter.

4. A densified ceramic-base composite in accordance with claim 1 in which said aluminum oxide and said diamond are each formed by densification of grains substantially all of which are less than about 200 nm in diameter.

5. A densified ceramic-base composite comprising aluminum oxide and diamond in a substantially uniform distribution at an aluminum oxide:diamond volume ratio of from about 75:25 to about 95:5, in which said aluminum oxide and said diamond are each formed by densification of fused grains having a number average grain size of from about 30 nm to about 300 nm.

6. A densified ceramic-base composite comprising aluminum oxide and diamond in a substantially uniform distribution at an aluminum oxide:diamond volume ratio of from about 75:25 to about 95:5, in which said aluminum oxide and said diamond are each formed of fused grains having a number average grain size of from about 75 nm to about 150 nm.

7. A densified ceramic-base composite in accordance with claim 1 in which said aluminum oxide:diamond volume ratio is from about 85:15 to about 95:5.

8. A densified ceramic-base composite in accordance with claim 1 in which said aluminum oxide:diamond volume ratio is from about 87.5:12.5 to about 92.5:7.5.

9. A densified ceramic-base composite in accordance with claim 1 in which said aluminum oxide is in an α-crystalline state.

10. A densified ceramic-base composite in accordance with claim 1 in which said composite consists of said aluminum oxide and said diamond.

* * * * *